US012744470B2

(12) United States Patent
Aiura

(10) Patent No.: US 12,744,470 B2
(45) Date of Patent: Sep. 22, 2026

(54) BRIDGE CIRCUIT

(71) Applicant: OMNIVISION INTEGRATED CIRCUITS GROUP, INC., Shanghai (CN)

(72) Inventor: Masami Aiura, Sendai-City (JP)

(73) Assignee: OMNIVISION INTEGRATED CIRCUITS GROUP, INC., Shanghai (CN)

( * ) Notice: Subject to any disclaimer, the term of this patent is extended or adjusted under 35 U.S.C. 154(b) by 88 days.

(21) Appl. No.: 18/933,607

(22) Filed: Oct. 31, 2024

(65) Prior Publication Data

US 2025/0364919 A1 Nov. 27, 2025

(30) Foreign Application Priority Data

May 24, 2024 (JP) ................................ 2024-085164

(51) Int. Cl.
*H02M 7/219* (2006.01)
*H02M 3/07* (2006.01)

(52) U.S. Cl.
CPC .............. *H02M 7/219* (2013.01); *H02M 3/07* (2013.01)

(58) Field of Classification Search
CPC ................................ H02M 7/219; H02M 3/07
See application file for complete search history.

(56) References Cited

U.S. PATENT DOCUMENTS

| | | | | |
|---|---|---|---|---|
| 5,481,221 | A * | 1/1996 | Gariboldi | H02M 3/07 327/536 |
| 2015/0207403 | A1* | 7/2015 | Kinsella | H02M 3/073 327/536 |
| 2018/0212600 | A1* | 7/2018 | Simmonds | H02M 5/293 |
| 2024/0333284 | A1* | 10/2024 | Yasuji | H03K 17/063 |
| 2024/0388219 | A1* | 11/2024 | Peker | H02M 7/219 |
| 2025/0070635 | A1* | 2/2025 | Blecic | H02M 1/0025 |
| 2025/0264898 | A1* | 8/2025 | Lee | G05F 3/26 |

FOREIGN PATENT DOCUMENTS

JP 2016220351 A 12/2016

* cited by examiner

*Primary Examiner* — Rafael O De Leon Domenech
(74) *Attorney, Agent, or Firm* — MUNCY, GEISSLER, OLDS & LOWE, P.C.

(57) ABSTRACT

A bridge circuit outputs an internal upper voltage to an upper line and outputs an internal lower voltage to a lower line according to an external power supply supplied to a first input terminal and a second input terminal. A bridge including four transistors of an upper first transistor, a lower second transistor, an upper third transistor and a lower fourth transistor is arranged between the upper line and the lower line. Moreover, a control end of the fourth transistor is connected to a first input end, and the first transistor is controlled by a level of the control end of the fourth transistor or the first transistor is diode-connected, and a control end of the third transistor is connected to a second input end, and the second transistor is controlled by the level of the control end of the fourth transistor or the first transistor is diode-connected.

4 Claims, 4 Drawing Sheets

BRIDGE CIRCUIT

BACKGROUND OF THE INVENTION

1. Field of the Invention

The disclosure relates to a bridge circuit of a semiconductor integrated circuit that outputs an internal upper voltage and an internal lower voltage according to an external power supply supplied to a first input end and a second input end.

2. Description of the Related Art

In a semiconductor integrated circuit, an external power supply is supplied to an input terminal from the outside to supply a direct-current (DC) power to an internal circuit. Here, a problem occurs when the external power supply is reverse-connected to the input terminal. For example, normal circuits do not support reverse connection. In addition, in a metal oxide semiconductor (MOS) transistor as a single element, when a reverse bias is applied to a semiconductor substrate, a current path of a parasitic bipolar element also appears, and the expected operation cannot be realized.

A rectifier using a diode bridge is known as an example of a solution to this problem. By using the diode bridge to rectify the external power supply to make it be an internal power supply, the problem of reverse connection of the external power supply to the input terminal is eliminated.

In addition, in order to reduce power loss of the diode, the technology that uses transistors instead of diodes has also been proposed. For example, in Patent document 1, each transistor in the transistor bridge is controlled to be on/off based on a power supply voltage monitoring comparator.

PRIOR ART DOCUMENTS

Patent Documents

[Patent document 1] Japanese Patent Laid-Open No. 2016-220351

SUMMARY OF THE INVENTION

Problems to be Solved

Here, in the technology described in Patent Document 1, a circuit such as the power supply voltage monitoring comparator is required. Therefore, the circuit scale becomes large.

Means to Solve Problems

A bridge circuit related to the disclosure is a bridge circuit of a semiconductor integrated circuit that outputs an internal upper voltage to an upper line and outputs an internal lower voltage to a lower line according to an external power supply supplied to a first input end and a second input end, the bridge circuit includes:

a first transistor, connected between the upper line and the first input end;

a second transistor, connected between the lower line and the first input end;

a third transistor, connected between the upper line and the second input end; and a fourth transistor, connected between the lower line and the second input end; wherein a control end of the fourth transistor is connected to the first input end, and the first transistor is controlled by a level of the control end of the fourth transistor or the first transistor is diode-connected, and a control end of the third transistor is connected to the second input end, and the second transistor is controlled by the level of the control end of the fourth transistor or the first transistor is diode-connected.

Effects

According to the bridge circuit related to the disclosure, the on/off of the transistor can be controlled by a relatively simple circuit.

PREFERRED EMBODIMENT OF THE PRESENT INVENTION

Hereinafter, embodiments of the disclosure will be described below with reference to the drawings. Note that, the following embodiments do not limit the scope of the disclosure, and configurations obtained by selectively combining multiple examples are also included in the disclosure.

"Circuit Configuration of Embodiment"

Figure 1:
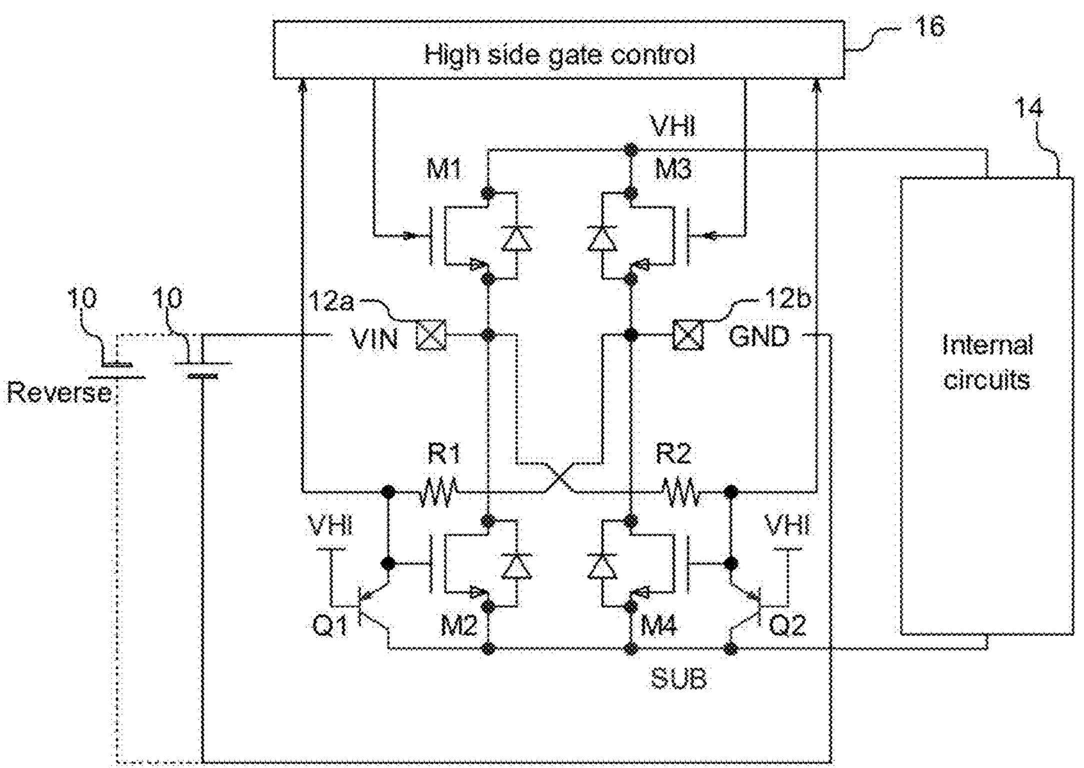
FIG. 1 is a circuit diagram showing the configuration of a bridge circuit according to an embodiment.

FIG. 1 is a circuit diagram showing the configuration of a bridge circuit according to an embodiment. The bridge circuit is formed as a semiconductor integrated circuit. A DC voltage from an external power supply 10 is supplied to a first input terminal 12*a* and a second input terminal 12*b*. In the illustrated example, it is assumed that the external power supply 10 is a DC power supply, and a positive external upper voltage VIN is supplied to the first input terminal 12*a* and a negative external lower voltage GND is input to the second input terminal 12*b*. However, in the figure, as shown by the dashed line, there is no problem even if the external power supply 10 is reverse-connected, the external lower voltage GND is supplied to the first input terminal 12*a*, and the external upper voltage VIN is input to the second input terminal 12*b*. Alternatively, an alternating-current (AC) voltage may be input.

Four transistors M1, M2, M3 and M4 are connected to form a transistor bridge. The source of the transistor M1 and the drain of the transistor M2 are connected. In addition, the source of the transistor M3 and the drain of the transistor M4 are connected. The drain of the transistor M1 and the drain of the transistor M3 are connected. In addition, the source of the transistor M2 and the source of the transistor M4 are connected.

Here, the transistor M1 is referred to as a first transistor, the transistor M2 is referred to as a second transistor, the transistor M3 is referred to as a third transistor, and the transistor M4 is referred to as a fourth transistor. In addition, the gate of a metal-oxide-semiconductor field effect transistor (MOSFET) and the base of a bipolar transistor are referred to as control ends.

In this example, the transistors M1, M2, M3 and M4 are n-channel MOSFETs, but p-channel transistors, a combination of the bipolar transistors and diodes, or the like can also be adopted.

The first input terminal 12*a* is connected to a connection point between the source of the transistor M1 and the drain of the transistor M2, and the second input terminal 12*b* is connected to a connection point between the source of the transistor M3 and the drain of the transistor M4.

In addition, the drain of the transistor M1 and the drain of the transistor M3 are connected to an internal upper line VHI. The source of the transistor M2 and the source of the transistor M4 are connected to an internal lower line SUB.

Additionally, the upper line VHI and the lower line SUB are connected to an internal circuit 14. The internal circuit 14 is a circuit that receives a power supply supplied from the upper line VHI and the lower line SUB so as to operates, and various circuits may be adopted depending on the purpose of the semiconductor integrated circuit.

The first input terminal 12*a* is connected to the gate of the transistor M4 via a resistor R2. The gate of the transistor M2 is connected to the lower line SUB via a transistor Q1. The transistor Q1 is a pnp transistor, the emitter of the transistor Q1 is connected to the gate of the transistor M2, and the collector of the transistor Q1 is connected to the lower line SUB. In this example, the transistor Q1 and a transistor Q2 are pnp transistors, but p-channel MOSFETs or the like may also be used.

The second input terminal 12*b* is connected to the gate of the transistor M2 via a resistor R1. The gate of the transistor M4 is connected to the lower line SUB via the transistor Q2. The transistor Q2 is a pnp transistor, the emitter of the transistor Q2 is connected to the gate of the transistor M4, and the collector of the transistor Q2 is connected to the lower line SUB. The bases of the transistors Q1 and Q2 are connected to the upper line VHI.

Here, the transistors Q1 and Q2 are respectively referred to as a first protective transistor and a second protective transistor. The resistors R1 and R2 are respectively referred to as a first resistor and a second resistor. In addition, the voltage of the upper line VHI is referred to as an internal upper voltage VHI, and the voltage of the lower line SUB is referred to as an internal lower voltage SUB.

A high side gate control 16 is connected to the gates of the transistors M1 and M3, and information about the voltages of the gates of the transistors M2 and M4 is supplied to the upper gate control circuit 16.

When the potential of the gate of the transistor M2 is high and the transistor M2 is on, the upper gate control circuit 16 sets the gate of the transistor M1 to a low level to turn off the transistor M1 and sets the gate of the transistor M3 to a high level to turn on the transistor M3. Furthermore, when the potential of the gate of the transistor M4 is high and the transistor M4 is on, the upper gate control circuit 16 sets the gate of the transistor M3 to a low level to turn off the transistor M3 and sets the gate of the transistor M1 to a high level to turn on the transistor M1.

In the circuit of FIG. 1, in a case where the external upper voltage VIN is input to the first input terminal 12*a* and the external lower voltage GND is input to the second input terminal 12*b*, by turning on the transistors M4 and M1 and turning off the transistors M2 and M3, the external upper voltage VIN is supplied to the upper line VHI, and the external lower voltage GND is supplied to the lower line SUB.

In addition, in a case where the external upper voltage VIN is input to the second input terminal 12*b* and the external lower voltage GND is input to the first input terminal 12*a*, by turning on the transistors M2 and M3 and turning off the transistors M4 and M1, the external upper voltage VIN is supplied to the upper line VHI, and the external lower voltage GND is supplied to the lower line SUB.

Note that, even if the transistors M1 and M3 are off, due to their parasitic diodes, the upper line VHI is at a high level, and therefore the transistors Q1 and Q2 are normally off. On the other hand, when the external upper voltage VIN is supplied to one of the first input terminal 12*a* or the second input terminal 12*b*, the gate voltage of the transistor M2 or M4 may rise greatly. In this example, the rise is suppressed by the resistor R1 or R2, and the transistors M2 and M4 are protected by turning on the transistor Q1 or Q2 in this case.

Here, the upper gate control circuit 16 controls the gate voltages of the transistors M1 and M3 as described above. The transistors M1 and M3 are n-channel transistors, and in order to turn on the transistor M1 or M3, it is necessary to supply a control voltage higher than the source voltage by a threshold voltage or more to the gate thereof. Accordingly, a control voltage may be generated by receiving a DC voltage supply from the outside or by boosting the voltage of the upper line VHI, and then the control voltage may be applied to the gate of the transistor M1 or M3 to be turned on. For example, the control voltage to the gate of the transistor M1 may be turned on and off by the gate voltage of M4, and the control voltage to the gate of the transistor M3 may be turned on and off by the gate voltage of the transistor M2. The control voltage can be turned on and off using, for example, a switch transistor or the like. In addition, it is also possible to diode-connect the transistors M1 and M3 and omit the upper gate control circuit 16 as in variation example 1.

Variation Example 1

Figure 2:
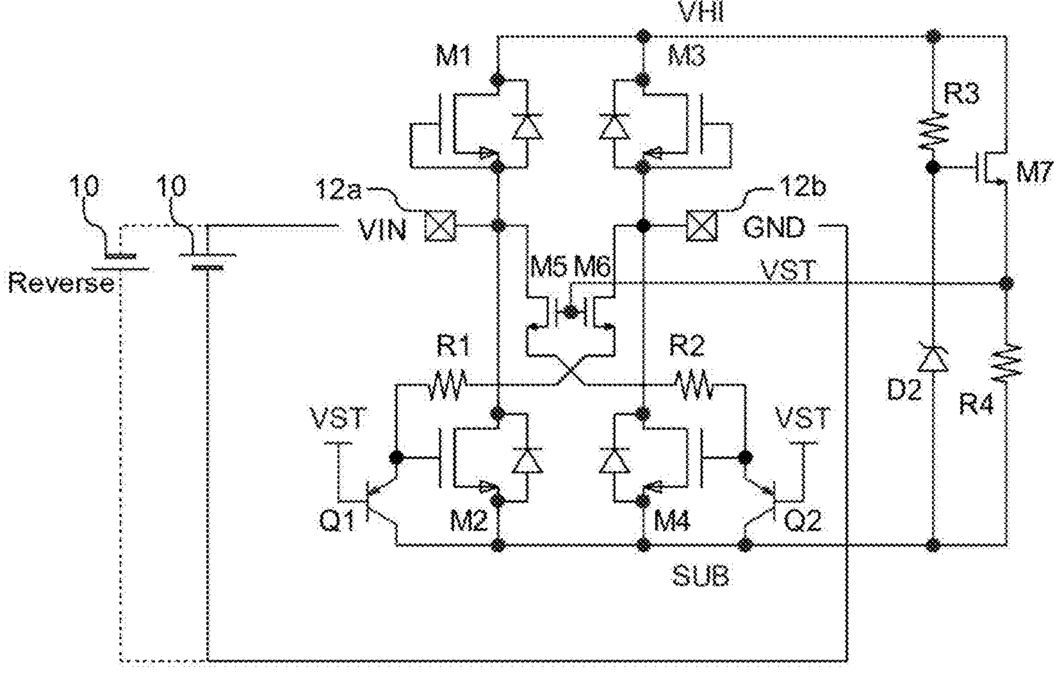
FIG. 2 is a circuit diagram showing the configuration of variation example 1.

FIG. 2 is a circuit diagram showing the configuration of variation example 1. In this circuit, a clamp voltage VST is used to protect the transistors M2 and M4.

One end of a resistor R3 is connected to the upper line VHI, the other end of the resistor R3 is connected to the cathode of a Zener diode D2, and the anode of the Zener diode D2 is connected to the lower line SUB. A connection point between the resistor R3 and the Zener diode D2 is connected to the gate of an n-channel transistor M7. The drain of the transistor M7 is connected to the upper line VHI, and the source of the transistor M7 is connected to the lower line SUB via a resistor R4. And, the clamp voltage VST is extracted from a connection point between the source of the transistor M7 and the resistor R4.

In this circuit, the voltage is applied from the upper line VHI to the Zener diode D2 via the resistor R3. If the voltage of the cathode of the Zener diode D2 is equal to or greater than a breakdown voltage of the Zener diode D2, the voltage of the cathode of the Zener diode D2 becomes a breakdown voltage Vbr. Accordingly, the gate voltage of the transistor M7 becomes Vbr, and the source voltage thereof becomes a voltage that is lower than the gate voltage by Vgs, that is, VST=Vbr−Vgs. In this way, the clamp voltage VST can be set according to the breakdown voltage of the Zener diode D2.

A transistor M5 is arranged between the first input terminal 12*a* and the resistor R2, and a transistor M6 is arranged between the second input terminal 12*b* and the resistor R1. The transistors M5 and M6 are n-channel transistors. Furthermore, the gates of the transistors M5 and M6 are in a common connection, and the clamp voltage VST is supplied thereto. In addition, in this example, the clamp voltage VST is also supplied to the bases of the transistors Q1 and Q2.

By this circuit, the source voltages of the transistors M5 and M6 are clamped to VST−Vgs, and the bases of the transistors Q1 and Q2 are clamped to VST+Vbe. Accordingly, the gate voltages of the transistors M2 and M4 are clamped to a predetermined voltage, and thereby the transistors M2 and M4 can be protected. Note that, Vbe is a base-emitter voltage.

In addition, in variation example 1, the upper gate control circuit 16 is omitted, and the transistors M1 and M3 are short-circuited between the gate and the source to function as diodes. Accordingly, a voltage corresponding to the external upper voltage VIN input to either the first input terminal 12*a* or the second input terminal 12*b* is set for the upper line VHI. Note that, a forward voltage drop caused by the diode occurs in the transistor M1 or the transistor M3, and VHI=VIN−Vf, but the transistors M2 and M4 function as transistors. Note that, the above Vf is a voltage drop of a parasitic diode of the transistor M3.

Variation Example 2

Figure 3:
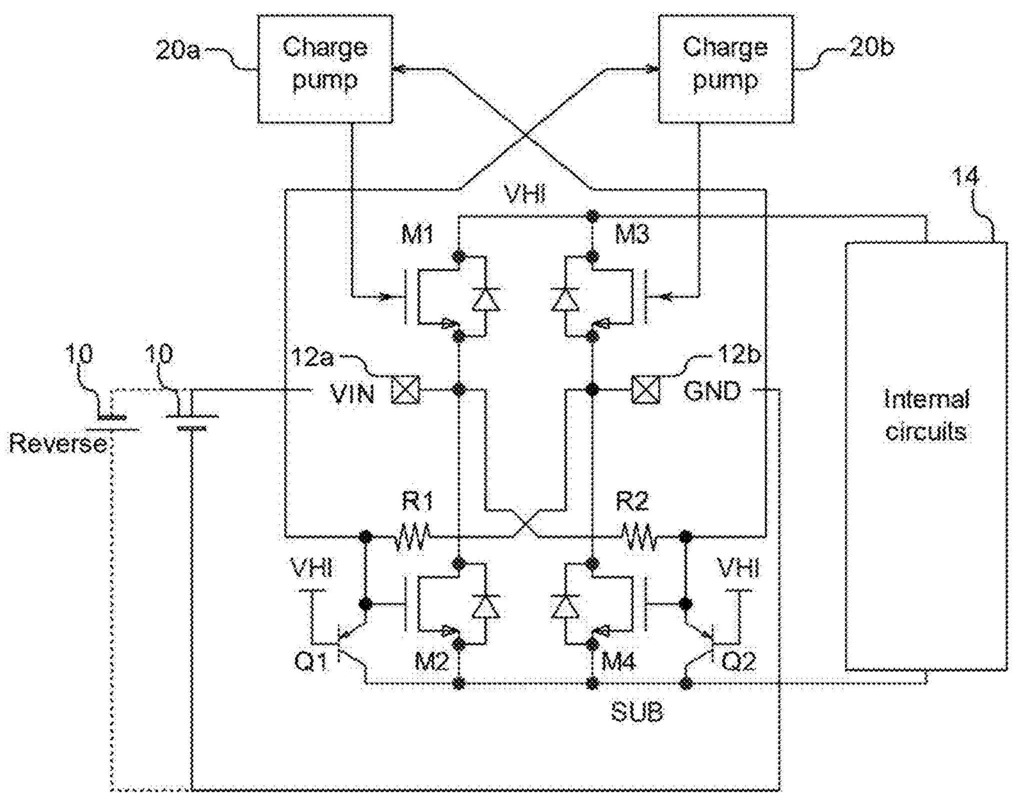
FIG. 3 is a circuit diagram showing the configuration of variation example 2.

FIG. 3 is a circuit diagram showing the configuration of variation example 2. In this circuit, charge pumps 20*a* and 20*b* are arranged instead of the upper gate control circuit 16 of FIG. 1.

The charge pumps 20*a* and 20*b* are respectively connected to the upper line VHI to boost the voltage of the upper line VHI. For the charge pumps 20*a* and 20*b*, a charge pump using a known capacitor can be used. In addition, the charge pumps 20*a* and 20*b* may have any configuration as long as they can achieve boosting. For example, a boost circuit using a coil and a transistor may also be used.

The gate voltage of the transistor M4 is supplied to the charge pump 20*a*, and in a case where the gate voltage of the transistor M4 is at a high level, the charge pump 20*a* supplies the boosted voltage to the gate of the transistor M1 to turn on the transistor M1. In addition, the gate voltage of the transistor M2 is supplied to the charge pump 20*b*, and in a case where the gate voltage of the transistor M4 is at a high level, the charge pump 20*b* turns on the transistor M3 by the boosted voltage.

In this way, the circuit of variation example 2 can operate similarly to the circuit of FIG. 1.

Variation Example 3

Figure 4:
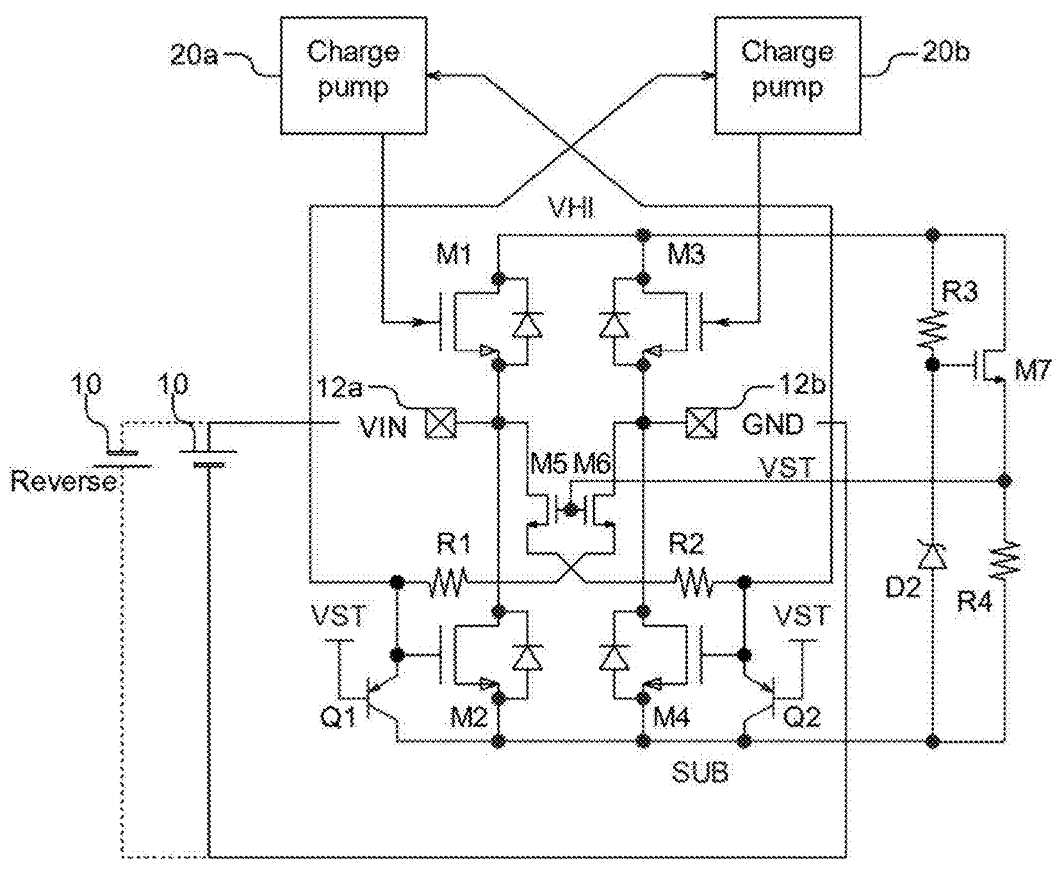
FIG. 4 is a circuit diagram showing the configuration of variation example 3.

FIG. 4 is a circuit diagram showing the configuration of variation example 3. In this circuit, the charge pumps 20*a* and 20*b* are arranged, and the clamp voltage VST is utilized.

That is, the configuration of clamping the gate voltages of the transistors M2 and M4 by the clamp voltage VST is similar to the configuration of FIG. 2. In addition, the configurations of the charge pumps 20*a* and 20*b* that turn the transistors M1 and M3 on and off are similar to that of variation example 2 of FIG. 3.

Effects of Embodiments

According to the bridge circuit according to the above embodiments, the transistors constituting the bridge circuit can be turned on and off according to the polarity from the outside supplied to the input terminal. Therefore, the on/off of the transistor can be controlled by a relatively simple circuit.

DESCRIPTION OF THE REFERENCE NUMERALS

10: external power supply
12*a*: first input terminal
12*b*: second input terminal
14: internal circuit
16: upper gate control circuit
20*a*, 20*b*: charge pump

What is claimed is:

1. A bridge circuit of a semiconductor integrated circuit that outputs an internal upper voltage to an upper line and outputs an internal lower voltage to a lower line according to an external power supply supplied to a first input end and a second input end, the bridge circuit comprising:

a first transistor, connected between the upper line and the first input end;

a second transistor, connected between the lower line and the first input end;

a third transistor, connected between the upper line and the second input end; and a fourth transistor, connected between the lower line and the second input end; wherein a control end of the fourth transistor is connected to the first input end, and the first transistor is controlled by a level of the control end of the fourth transistor or the first transistor is diode-connected, and a control end of the third transistor is connected to the second input end, and the second transistor is controlled by the level of the control end of the fourth transistor or the first transistor is diode-connected.

2. The bridge circuit according to claim 1, wherein the first input end is connected to the control end of the fourth transistor via a first resistor, and the second input end is connected to a control end of the second transistor via a second resistor.

3. The bridge circuit according to claim 1, wherein the control end of the fourth transistor is connected to the lower line via a first protective transistor, and the control end of the second transistor is connected to the lower line via a second protective transistor.

4. The bridge circuit according to claim 1, wherein the first to fourth transistors are n-channel MOSFETs, the bridge circuit further has a charge pump that generates a control voltage higher than the internal upper voltage, and the charge pump turns on the first transistor in a case where the voltage of the control end of the fourth transistor is at a high level, and turns on the third transistor in a case where the voltage of the control end of the second transistor is at a high level.

* * * * *